Patented Feb. 28, 1933

1,899,607

UNITED STATES PATENT OFFICE

MAX BUCHNER, OF HANOVER-KLEEFELD, GERMANY

PROCESS OF PRODUCING SALTS OF HYDROFLUOSILICIC ACID

No Drawing. Application filed February 17, 1931, Serial No. 516,495, and in Germany February 24, 1930.

This invention relates to the production of salts of the hydrofluosilicic acid and consists in mixing fluorides with hydrofluosilicic acid and introducing silicon fluoride into this mixture. For carrying through the process high or highest concentrated hydrofluosilicic acid is preferably employed, that is one containing about 30 to 50% by weight of $H_2SiF_6$. As fluorides, those of the alkalies, of the ammoniums, of the alkaline earths and also many other light and heavy metals come into question. The process can be carried out in an excellent manner especially with the fluorspar $CaF_2$ easily accessible in nature.

The process, carried through with calcium fluoride, is illustrated for example by the following equation:—

$$CaF_2 + SiF_4 + H_2SiF_6 = CaSiF_6 + H_2SiF_6 \quad (I).$$

As the equation shows, the hydrofluosilicic acid comes out of the reaction unchanged. Consequently it is not used up. The part which it plays in the process—and this is an important discovery of the inventor—consists in a purely accelerating effect. The hydrofluosilicic acid in the process according to the invention acts as a catalyst for the direct union of $SiF_4$ with calcium fluoride. It has already been proposed to unite silicon fluoride on calcium fluoride by allowing $SiF_4$ gas to act on dry fluorspar powder. However this process could not further be developed, as experiments showed, because the yields in calcium silico fluoride were very small, being only about 2 to 5%, relative to the quantity of fluorspar employed. Only the surprising discovery of the inventor to catalyze the reaction between silicon fluoride and calcium fluoride by hydrofluosilicic acid led to the development of the technically well applicable process.

The inventor has further found, that fluorspars polluted with silicic acid, which are of poorer quality and cannot be designated as "acid spar", can also be used for carrying through this process. Using such material however a portion of the hydrofluosilicic acid is consumed so that hydrofluosilicic acid acts both as catalyst and also as reaction component according to the equation:

$$4CaF_2 + SiO_2 + SiF_4 + 3H_2SiF_6 = 4CaSiF_6 + H_2SiF_6 + 2H_2O \quad (II).$$

This presents the further advantage, that no foreign substances participate in the reaction or are produced thereby, as would be the case, if instead of hydrofluosilicic acid other acids were employed, as has already been tried.

Some time back as means for producing alkaline silico fluoride, hydrofluosilicic acid associated with silicic acid was made to act on an alkaline salt not containing fluorine, for example common salt, in the presence of a great excess of hydrochloric acid. It is obvious that this method differs considerably from the process according to the invention by the difference in the components.

The silico fluorides obtained according to the invention can, as far as they are soluble, as for instance the calcium silico fluoride, be separated from any existing excess fluorspar by filtration and converted with other salts to the desired silico fluorides. It is however possible by further addition of the necessary components $CaF_2$ and $SiF_4$ to the reaction mixture to cause the soluble silico fluorides forming to a certain extent to separate as salts and to bring them to crystallization. In this manner it is possible without difficulty to separate for example calcium silico fluoride in solid crystallized form from the reaction mixture. This calcium silico fluoride can then be converted to any other desired, for example also to insoluble silico fluorides, such as sodium silico fluoride.

Finally the absorption of the silicon fluoride by the reaction mixture is effected with particular advantage under heat or under pressure or under heat and pressure above atmospheric pressure.

I claim:

1. Process of producing calcium silicofluoride comprising contacting calcium fluoride with hydrofluosilicic acid and introducing silicon fluoride into this mixture.

2. Process of producing calcium silicofluoride comprising contacting silica containing calcium fluoride with hydrofluosilicic acid and introducing silicon fluoride into the mixture.

3. Process of producing a hydrofluosilicic acid salt comprising mixing a metal fluoride with hydrofluosilicic acid and introducing silicon fluoride into this mixture.

4. Process of producing a hydrofluosilicic acid salt comprising mixing a metal fluoride with highly concentrated hydrofluosilicic acid and introducing silicon fluoride into this mixture.

5. Process of producing a hydrofluosilicic acid salt comprising mixing a metal fluoride with hydrofluosilicic acid of the highest possible concentration and introducing silicon fluoride into this mixture.

6. Process of producing a hydrofluosilicic acid salt comprising mixing a metal fluoride with hydrofluosilicic acid and introducing silicon fluoride into the mixture while heating it.

7. Process of producing a hydrofluosilicic acid salt comprising mixing a metal fluoride with hydrofluosilicic acid and introducing silicon fluoride into the mixture while holding it under a pressure above atmospheric pressure.

8. Process of producing a hydrofluosilicic acid salt comprising mixing a metal fluoride with hydrofluosilicic acid and introducing silicon fluoride into the mixture while heating and holding it under a pressure above atmospheric pressure.

9. A process of producing a hydrofluosilicic acid salt which comprises contacting a material of the group consisting of alkali metal fluoride, alkaline earth metal fluoride, and ammonium fluoride with hydrofluosilicic acid and introducing silicon fluoride into this mixture.

10. A process of producing a hydrofluosilicic acid salt which comprises contacting a material of the group consisting of alkali metal fluoride, alkaline earth metal fluoride, and ammonium fluoride with hydrofluosilicic acid and introducing silicon fluoride to this mixture at an elevated temperature.

11. A process of producing a hydrofluosilicic acid salt which comprises contacting a material of the group consisting of alkali metal fluoride, alkaline earth metal fluoride, and ammonium fluoride with hydrofluosilicic acid and introducing silicon fluoride to this mixture at an elevated pressure.

In testimony that I claim the foregoing as my invention, I have signed my name hereto.

MAX BUCHNER.